Patented June 7, 1927.

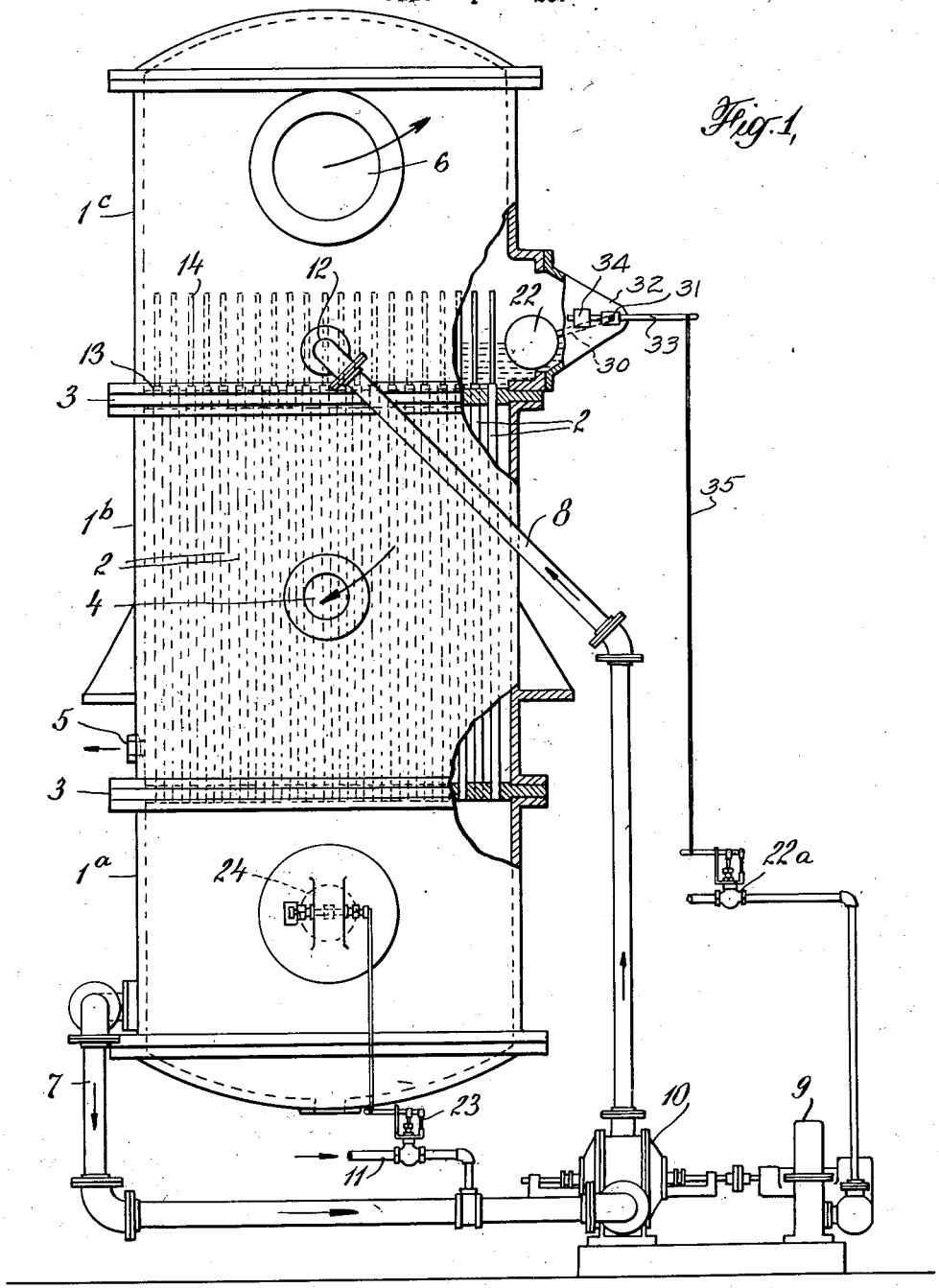

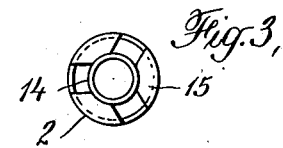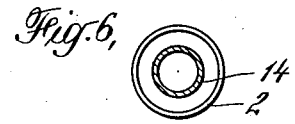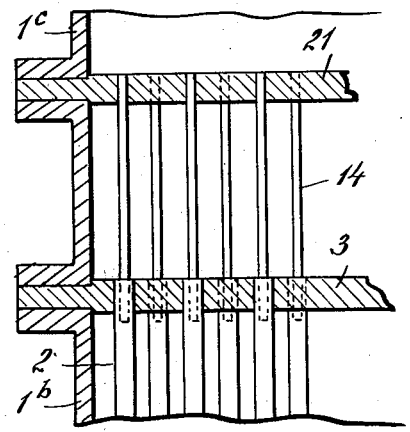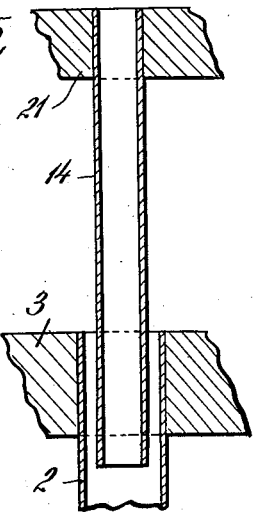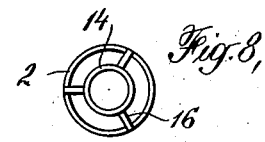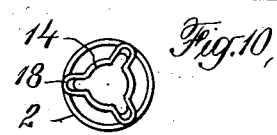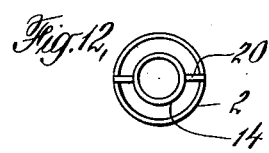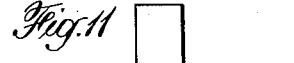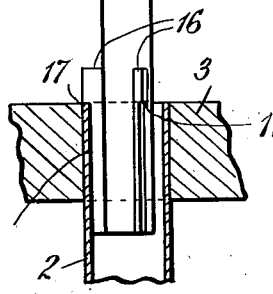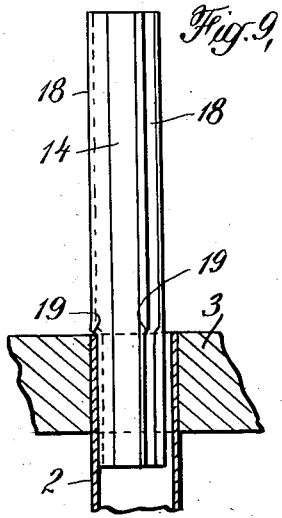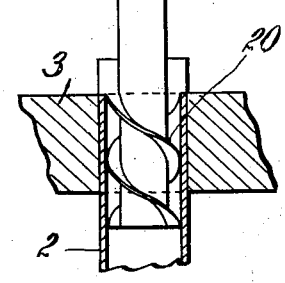

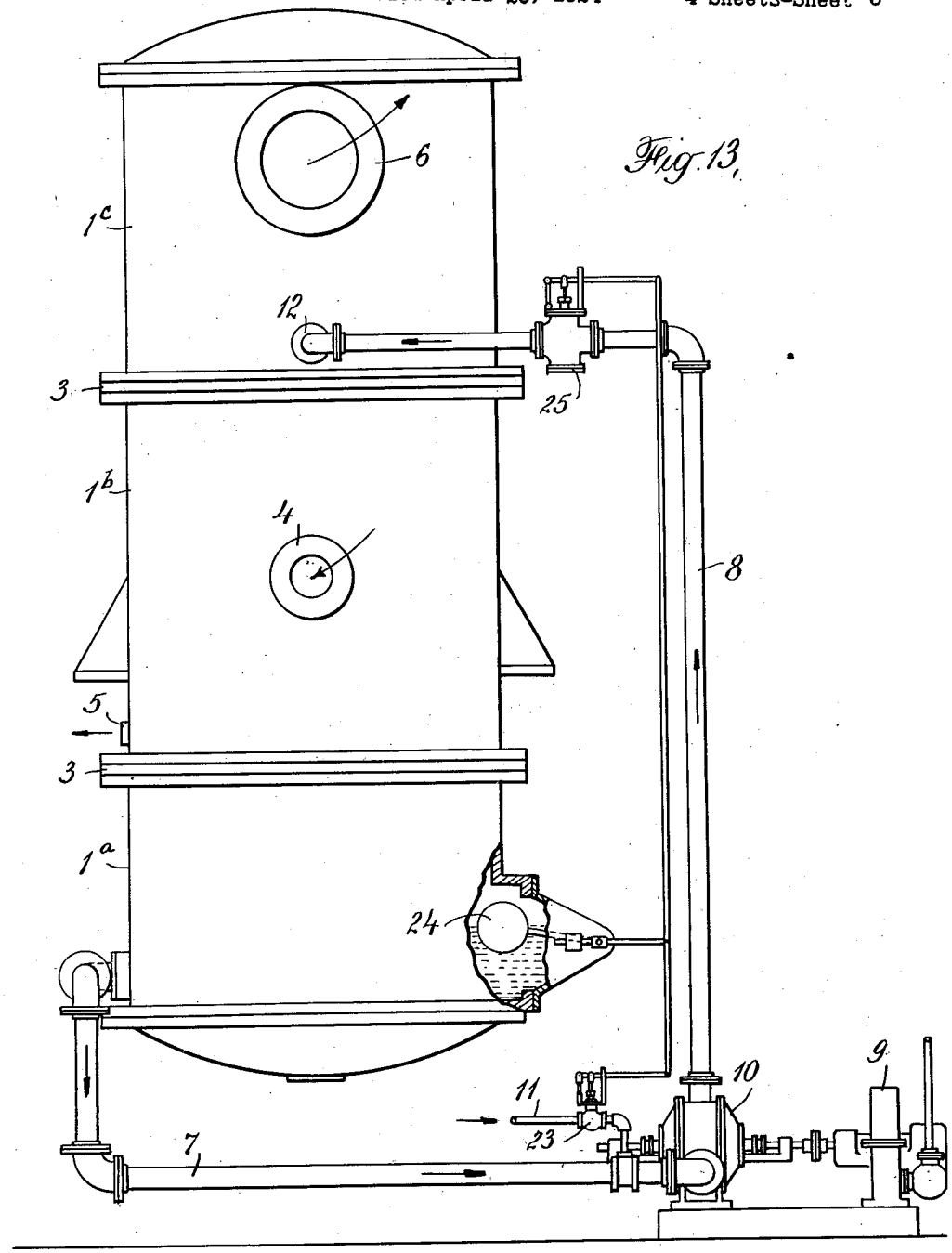

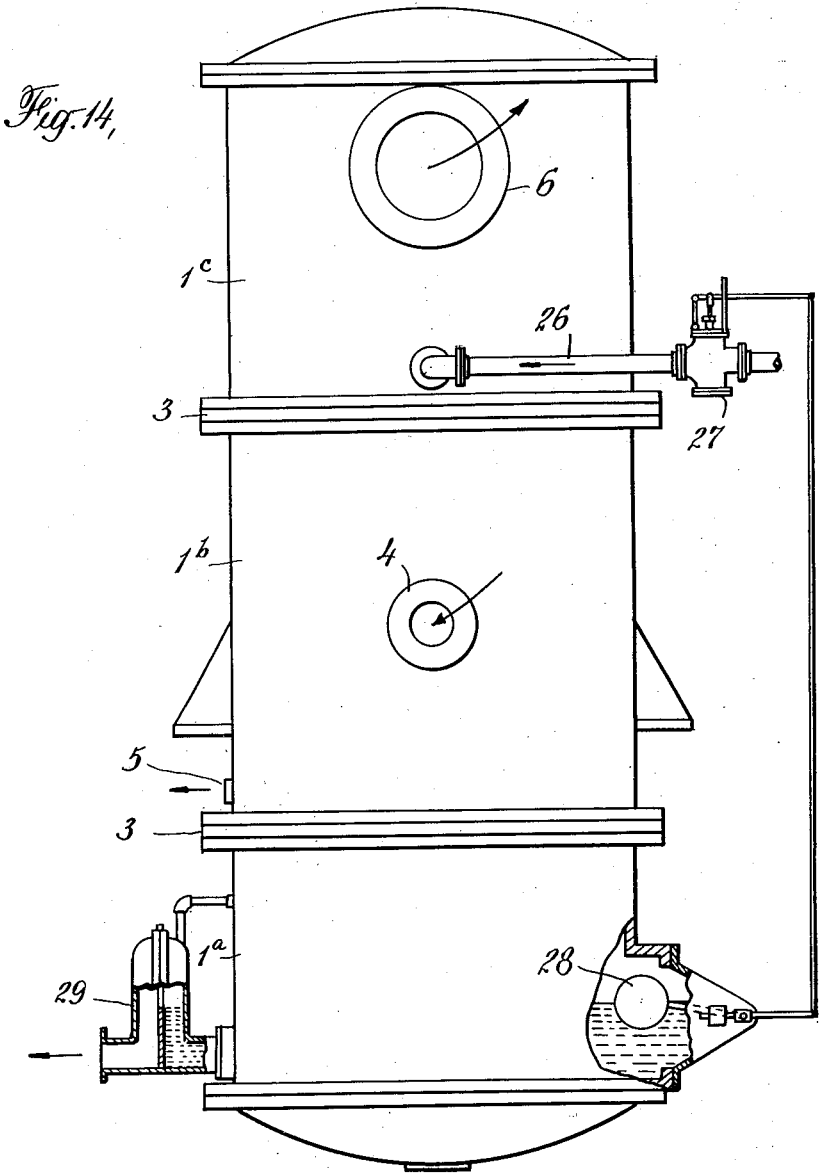

1,631,162

UNITED STATES PATENT OFFICE.

LESLIE EARL SEBALD, OF RIDGEWOOD, NEW JERSEY, ASSIGNOR TO THE GRISCOM-RUSSELL COMPANY, OF NEW YORK, N. Y., A CORPORATION OF DELAWARE.

VERTICAL FILM-TYPE EVAPORATOR.

Application filed April 25, 1924. Serial No. 709,028.

The present invention relates to an evaporator for producing purified boiler feedwater and has to do particularly with the so-called film type of evaporator wherein the liquid is distributed in a thin layer or film over the heating surface of the apparatus in contrast to the type of evaporator wherein the heating element is submerged.

The film type evaporator as commonly constructed employs a heating element consisting of a large number of closely grouped tubes extending along the evaporator shell in substantial parallelism and constituting a unitary tube bundle. Heating steam is passed through the tubes and the liquid to be evaporated is distributed over the outer surfaces of the tubes. The intent in an evaporator of this type is to so distribute the liquid that it will completely cover the tube surfaces in a relatively thin film.

Film type evaporators have certain well defined advantages, among which may be mentioned high efficiency per square foot of heating surface available and a large disengaging surface; that is, a large exposed liquid surface from which the generated vapor may leave the liquid body. These advantages are, however, likely to be largely theoretical due to the fact that operating conditions encountered in actual practice do not conform to the theoretical requirements of the device. For instance, if the film of liquid is not distributed uniformly over the entire surface of all of the tubes of the heating element portions of the tube surfaces are likely to become dry and thus decrease the actual amount of heating surface which is effectively employed in generating vapor. Where the entire heating surface is kept wet at all times the concentrated liquid occurring after a portion of the liquid has been vaporized flows down through the apparatus and accumulates in the bottom of the evaporator shell. During the vaporizing action which takes place while the film of liquid covers the heating tubes certain of the scale forming impurities contained in the liquid are precipitated out and necessarily accumulate to a certain extent upon the tube surfaces. However, the larger part of the contained impurities remain in solution and are collected at the bottom of the evaporator shell from whence they may be discharged as desired. If portions of the heating surface become dry from time to time all of the impurities contained in the water are deposited on the heating surfaces in a scaly deposit of flinty hardness. The result is that the heating tubes scale up very quickly and frequent cleaning of the surfaces is necessary. The scale is exceedingly difficult to remove and is particularly so due to the fact that in the type of tube bundle commonly employed the inner tubes are difficult of access with a cleaning tool.

It is a principal object of this invention to provide a film type evaporator wherein the above mentioned theoretical advantages may be attained and wherein the practical difficulties of operation, such as formation of heavy scale deposits with the consequent necessity of frequent cleaning, difficulty of scale removal, and the like, are avoided. To attain this end I arrange for a thorough and uniform distribution of the liquid over the entire inner surfaces of the tubes and by reason of this manner of distributing the liquid to leave a free passage at the central portion of the tube whereby generated vapor may flow up the length of the tube having substantially no interference with the impure liquid. By thus thoroughly and effectively distributing the liquid over the entire inner surfaces of the tubes, drying of the portions of the tube surfaces is prevented with the result that the scale deposits on the heating surfaces are reduced to a minimum. The provision of a clear vapor passage up the center of the heating tubes improves the purity of the evaporator output and this advantage is particularly marked due to the fact that I provide for conducting the vapor from the heating surfaces to the vapor outlet on the evaporator shell without at any time bringing it into interference with the incoming liquid.

It is also an object of the invention to provide in a film type evaporator wherein recirculation is employed, that is, where the liquid being evaporated is passed repeatedly over the heating surfaces, a regulating means whereby a predetermined rate of circulation of the liquid over the heating surfaces may be obtained depending upon the requirements of operation and wherein automatic regulation is provided to maintain constant the particular rate of circulation desired.

My invention also contemplates automatic regulating means for supplying raw water to the evaporator at a rate corresponding to the rate of evaporation so that at all times the amount of raw water admitted will compensate for the reduction in liquid volume due to evaporation. Similarly I may provide for maintaining the evaporator discharge at a substantially constant degree of concentration.

I have illustrated preferred embodiments of my invention in the accompanying drawings, wherein—

Figure 1 is an elevational view partly in section illustrating an evaporator embodying my invention;

Figures 2 and 3 and Figures 7 to 12 are detail views showing various constructions of vapor tubes which may be employed;

Figures 4 to 6 illustrate a preferred construction and arrangement of vapor tubes;

Figure 13 is an elevational view similar to Fig. 1 showing a modified form of apparatus, and Figure 14 is a similar view showing a further modified embodiment.

Referring to the drawings, particularly to Figure 1, the shell of the evaporator consists of three sections, 1ª, 1ᵇ and 1ᶜ, arranged vertically one above the other. The heating tubes 2 are arranged vertically within the shell section 1ᵇ and have their ends expanded or otherwise securely fixed in upper and lower tube sheets 3. Steam is admitted through the inlet opening 4 and is condensed by circulation about the exterior of the tubes 2, the condensate being discharged through an outlet 5 provided for the purpose. The upper shell section 1ᶜ serves as the vapor space and is provided with an outlet 6 through which the vapor output is discharged. Provision is made for recirculation by withdrawing liquid from the lower shell section 1ª through the pipe 7 and delivering it into the upper shell section through the line 8. The power for effecting the recirculation is derived from a steam turbine 9 serving to drive the pump 10 positioned in the recirculation line. A feed line 11 joins with the recirculation line 7 at the suction side of the pump 10 so that a suitable quantity of raw feed-water may be introduced into the volume of liquid which is to be delivered to the heating element of the apparatus.

The line 8 admitting water to the apparatus for circulation over the heating element, enters the lower part of the upper shell section 1ᶜ as indicated at 12. The incoming water is permitted to flow freely over the upper tube sheet 3 where it is maintained at an appropriate level such as indicated in Figure 1. Concentrically arranged within the upper end of each heating tube 2, as indicated at 13, is a short vapor tube 14 extending up above the heating tubes and being of such diameter that a small annular space is provided between the exterior surface of the vapor tube and the interior surface of the heating tube. The water level being above the upper ends of the heating tubes permits an appropriate quantity of water to flow down through this annular space and at the same time insures distribution of the downflowing liquid in a film immediately adjacent the interior surfaces of the heating tubes. I have found that with this arrangement the liquid will flow down through the entire length of the tubes as a film adhering to the tube surface and leaving a free space through the center of the tube. As the liquid film flows down through the heating tubes the steam circulating in the shell section 1ᵇ effects vaporization of a portion of the liquid and the vapor rises through the free space in the center of the tubes and passes up thru the vapor tubes 14 from whence it may be discharged from the evaporator. It will be noted that nowhere during the passage of the vapor out of the apparatus does it come into interference with the incoming liquid. The provision of the vapor tubes 14 extending to a point above the liquid level in the shell section 1ᶜ furnishes a means of egress which carries the vapor through the liquid body without permitting any contact which might contaminate the outgoing vapor with impurities contained in the liquid. The vapor rises through the heating tubes 2 at a designedly slow velocity so that there will be substantially no agitation within the heating tubes.

The shell section 1ᶜ is bolted or otherwise secured to the rest of the apparatus in such manner as to be readily removable for withdrawal of the vapor tubes 14 and the cleaning of the heating tubes. The tubes 2 are straight tubes and any scale deposited on the interior tube surfaces may be readily removed by introducing a cleaning tool adapted to fit within the tube and reach throughout its length. The vapor tubes 14 may be supported within the heating tubes 2 in any appropriate manner. The construction employed in Figure 1 is shown in detail in Figures 2 and 3, wherein ferrules 15 secured to the vapor tube serve to effect the proper spacing between the vapor tube and the heating tube. Figures 7 to 12 show further means of support. In Figures 7 and 8 straight fins 16 are provided which fit inside the heating tubes 2 and are provided with shoulders 17 to determine the extent of the insertion of the vapor tube. To remove the tube it is merely necessary to withdraw it from its operative position without necessity of loosening any connections. In Figures 9 and 10 the tube is shown with expanded flanges 18, shouldered at 19 to determine the extent of insertion of the tube, and in Figures 11 and 12 a spiral fin arrangement 20 is employed.

In Figures 4 to 6 I have shown a somewhat modified arrangement of vapor tubes. In this construction a tube sheet 21 in which the upper ends of the vapor tubes 14 are secured is employed. The vapor tubes are properly spaced in the tube sheet 21 and the tube sheet is mounted to permit the lower ends of the vapor tubes to extend an appropriate distance into the heating tubes 2. Liquid is admitted into the chamber formed between the tube sheets 3 and 21. As is the case in the structure shown in Figure 1, the quantity of liquid admitted into the heating tubes through the annular spaces depends upon the depth of liquid above the tube sheet 3. The structure of Figures 4 to 6 however has the advantage that after the liquid completely fills the chamber between the tube sheets 3 and 21 the quantity of liquid admitted to the heating tubes may be further increased by putting the liquid under additional pressure. This construction may be of advantage under certain conditions.

In Figure 1, I have illustrated a construction designed to obtain the proper rate of circulation over the heating surfaces and at the same time to maintain this rate of circulation constant. The required rate of circulation will depend on the evaporator capacity, that is, upon the rate of evaporation produced by the supply of heating steam available. The rate of evaporation which will occur requires a certain rate of circulation of liquid over the heating surfaces and at the same time requires that a certain amount of raw water be supplied to compensate for the liquid being evaporated. The annular spaces through which liquid is introduced into the heating tube may be so calculated as to admit a proper quantity of liquid for a given liquid level maintained in the shell $1^c$. Similarly the rate at which liquid is admitted to the heating tubes for different liquid levels in the shell $1^c$ may be calculated so that when a particular rate of circulation is desired the regulating float 22 and associated valve $22^a$ may be set to regulate for the particular liquid level desired.

To maintain a predetermined rate of circulation the liquid level in the shell $1^c$ must of course be maintained substantially constant. The float controlled valve $22^a$ is here shown positioned in the steam line supplying the turbine 9 which drives the recirculation pump. Hence, if the liquid level in the shell section $1^c$ rises slightly above the proper level float 22 will serve to partially close valve $22^a$ and thus reduce the amount of liquid supplied by the pump 10 so that the liquid may be reduced to its proper level. In this manner a substantially constant liquid level in the shell $1^c$ is obtained. It will be seen therefore that by varying the liquid level different rates of circulation throughout a considerable range may be obtained and at the same time any given rate of circulation will be maintained substantially constant by means of the float regulated valve $22^a$. The controlling of the constant liquid level to occur at any desired height in the shell, is accomplished by the structure shown in Figure 1 supporting the ball-float 22 on arm 30. This structure comprises a ball-float 22 supported by ball-float lever arm 30, which in turn is rigidly attached to the pivot shaft 31 passing through a lobe 32 on the shell $1^c$ and having attached to it, a lever 33 which carries a counterbalance 34 at the ball-float end, and is attached to the link 35 at the other end. The functioning of this arrangement is similar to that of the usual balance-lever rocker-arm valve operating system, and is clear from the drawings.

For the purpose of supplying a suitable proportion of raw water a second float controlled valve 23 is provided having its actuating float 24 placed in the lower shell section $1^a$ and intended to maintain a constant liquid level in that section. If, for instance, the liquid level in the shell section $1^a$ recedes the float 24 will serve to open valve 23 somewhat and permit a larger proportion of raw water to enter through the feed line 11, whereupon the deficiency in the liquid passing the heating element 2 will be remedied.

The structure shown in Figure 13 operates to maintain a constant ratio of circulating water to vapor produced. In this construction the float is positioned in the lower shell section $1^a$ and controls both valve 23 in the raw water feed line and a valve 25 in the recirculation line on the discharge side of the pump 10. The valve 23 serves to regulate the admission of raw water in the manner just described and its action is controlled through float 24 which regulates for a substantially constant liquid level in the shell section $1^a$. If, for instance, the liquid level recedes somewhat the valve 23 will be opened slightly to admit a larger proportion of raw water and at the same time valve 25 will be opened somewhat to permit of the increased flow into the evaporator. In this manner the admission of liquid to the evaporator may be maintained in substantially constant ratio to the rate of evaporation.

Figure 14 shows a unit wherein no recirculation is employed. The feed line 26 supplies raw water to the upper shell section $1^c$ and the valve 27 controlled by a float 28 in the lower shell section $1^a$ serves to admit a proper proportion of feed. By regulating for substantially constant level in the shell section $1^a$ the float 28 and its associated valve 27 serve to admit liquid at a rate equal to the rate of evaporation, that is, a constant ratio between raw water admitted and vapor produced with a correspondingly constant density of discharge, is maintained. A weir overflow 29 is provided to restrict the discharge of concentrated liquid. By varying the quantity of discharge thru the weir overflow 29 any desired concentration may be maintained. The constant discharge which occurs over the weir insures that the entire heating surface will at all times be wet and will therefore be effective, for the reason that the entire surface must be covered with a film of liquid before any excess liquid will pass to the weir.

While I have illustrated a preferred embodiment of my invention, it is to be understood that certain changes and modifications may be made within the scope of the appended claims.

I claim:

1. An evaporator of the class described comprising a plurality of heat transferring tubes, means for bringing a heating medium into heat exchanging relation with the exterior of the tubes, a liquid chamber adjacent the upper ends of said tubes, wherein a quantity of liquid is maintained submerging the said tube ends, vapor tubes concentric with said heating tubes and extending into the open ends thereof to thereby constitute an inlet passage for the water through the annular space between the outer wall of the vapor tube and the inner wall of the heating tube, means for automatically maintaining a substantially constant liquid level in said chamber to thereby insure a correspondingly constant rate of delivery of liquid to said heating tubes, said means including a float in said liquid chamber, a valve operated by said float, a collection chamber below said liquid chamber, connections between said liquid chamber and said collection chamber, a variable speed pump in the connecting line between said collecting chamber and said liquid chamber, and connections between said float controlled valve and said pump, and means whereby the said constant liquid level may be controlled to occur at a desired height in the shell including a weight adjustably associated with said float to vary the submergence thereof.

2. An evaporator of the class described comprising a plurality of heat transferring tubes, means for bringing a heating medium into heat exchanging relation with the exterior of the tubes, a liquid chamber adjacent the upper ends of said tubes wherein a quantity of liquid is maintained submerging the said tube ends, vapor tubes concentric with said heating tubes and extending into the open ends thereof to thereby constitute an inlet passage for the water through the annular space between the outer wall of the vapor tube and the inner wall of the heating tube, means for automatically maintaining a substantially constant liquid level in said chamber to thereby insure a correspondingly constant rate of delivery of liquid to said heating tubes, means whereby the said constant liquid level may be controlled to occur at a desired height in the shell and thereby provide for the desired delivery rate, and regulating means for introducing raw water to compensate for the evaporation taking place comprising a collection chamber for receiving unevaporated liquid issuing from the heating tubes, a raw water feed line, and a float controlled valve in said line actuated to maintain a substantially constant liquid level in said chamber whereby the quantity of raw water admitted is dependent upon the rate of evaporation.

3. An evaporator of the class described comprising a plurality of heat transferring tubes, means for bringing a heating medium into heat exchanging relation with the exterior of the tubes, a liquid chamber adjacent the upper ends of said tubes wherein a quantity of liquid is maintained submerging the said tube ends, vapor tubes concentric with said heating tubes and extending into the open ends thereof to thereby constitute an inlet passage for the water through the annular space between the outer wall of the vapor tubes and the inner wall of the heating tubes, means for automatically maintaining a predetermined liquid level in said chamber to thereby insure a proper delivery of liquid to said heating tubes, means for recirculating the liquid passing through the heating tubes unevaporated and regulating means for automatically supplying to said evaporator such quantity of fresh liquid as will compensate for the liquid converted into vapor.

4. An evaporator of the class described comprising a plurality of heat transferring tubes, means for bringing the heating medium into heat exchanging relation with the exterior of the tubes, means for supplying said tubes with liquid and regulating means dependent on the rate of evaporation for maintaining a substantially constant ratio between the rate of evaporation and the rate of circulation of the liquid through the heating tubes, said regulating means including a float in said liquid chamber, a valve operated by said float, a collection chamber below said liquid chamber, connection between said liquid chamber and said collection chamber, a variable speed pump in the connecting line between said collection chamber and said liquid chamber, and connections between said float control valve and said pump.

5. An evaporator of the class described, comprising a plurality of heat transferring tubes, means for bringing a heating medium into heat exchanging relation with the exterior of the tubes, a liquid chamber adjacent the upper ends of said tubes wherein a quantity of liquid is maintained submerging said tube-ends, vapor tubes extending into the open ends thereof to thereby constitute an inlet passage for the water, means for automatically maintaining a substantially constant liquid level in said chamber to thereby insure a correspondingly constant and predetermined rate of delivery of liquid to said heating tubes, means whereby said constant and predetermined liquid level may be struck at any desired height in the shell and thereby provide for the predetermined delivery rate, and regulating means for introducing raw water to compensate for the evaporation taking place.

6. An evaporator of the class described, comprising a plurality of heat-transferring tubes, means for bringing a heating medium into heat exchanging relation with the exterior of the tubes, a liquid chamber adjacent the upper ends of said tubes wherein a quantity of liquid is maintained submerging said tube ends, vapor tubes extending into the open ends thereof to thereby constitute an inlet passage for the water, means for automatically maintaining any predetermined liquid level in said chamber to thereby insure a proper concentration of the liquid delivered to said heating tubes, means for recirculating the liquid passing through said tubes, and regulating means for supplying to said heating tubes a quantity of untreated liquid.

In testimony whereof I affix my signature.

LESLIE EARL SEBALD.